2,835,675

ELYMOCLAVINE AND MANUFACTURE OF ERGOT ALKALOIDS BY CULTURE

Matazo Abe, Nishinomiya, Hyogo, Togo Yamano, Yamatotakada, Nara, Yoshiharu Kozu, Nakagyoku, Kyoto, and Mitsugi Kusumoto, Nishiimazato, Higashinariku, Japan No Drawing. Application October 24, 1952
Serial No. 316,814

Claims priority, application Japan November 2, 1951

14 Claims. (Cl. 260—285.5)

This invention relates to elymoclavine, a new ergot alkaloid, and a method which consists of cultivating ergot fungus possessing a nature to produce an extraordinarily large quantity of ergokryptinine in culture, and separating ergokryptinine, agroclavine and elymoclavine from the culture.

In 1943 A. Stoll and A. Hofmann made clear that the ergotoxine reported by G. Barger and F. H. Carr (J. Chem. Soc., vol. 91, p. 377 (1907)) and by F. Kraft (Arch. Pharm., vol. 244, p. 336 (1906)), etc. was nothing but a mixture of three alkaloids, ergocristine, ergokryptine and ergocornine, and that the ergotinine reported by C. Tanret (C. R. Acad. Sci., vol. 81, p. 891 (1875)) was also a mixture consisting of ergocristinine, ergokryptinine and ergocorninine which are isomers of the above three alkaloids.

At present, therefore, there are known ten so-called peptide-type ergot alkaloids which are ergotamine, ergosine, ergocristine, ergokryptine, ergocornine, ergotaminine, ergosinine, ergocristinine, ergokryptinine and ergocorninine, the last five alkaloids being the isomers of the first five, respectively.

Although all these alkaloids are being used extensively, as such or in the form of their derivatives, for clinical purposes, their supply is very poor in all countries, because the growth of ergot not only requires large space of land and great man-power, but also is affected very much by the climatic conditions. Therefore, if artificial culture of ergot fungus is possible and the preparation of peptide-type ergot alkaloids from the culture is practicable, not only can ergot be replaced by the culture but also mass production of the alkaloids is promising, not to speak of the resulting easy scientific control of the production.

With these anticipations many researchers have so far been studying the artificial culture of ergot fungus with negative result. Indeed, it is only agroclavine, a non-peptide-type ergot alkaloid discovered by the present inventors (Annual Reports of Takeda Research Laboratory, vol. 10, pp. 145, 162, 171 (1951)), that can be prepared in large quantity by artificial culture.

As is evident from a series of reports by A. McCrea (Amer. Jour. Bot., vol. 18, p. 50 (1931)); H. Kreitmair and W. Küssner (Biochem. Zeitschrift, vol. 239, p. 189 (1931)); R. Jaretzky (Archiv. d. Pharmazie, vol. 273, p. 348 (1935)); E. Baldacei (Farmaco. Sci. e Tec. L., vol. 1, p. 187 (1946)); S. K. Sim and H. W. Youngken, Fr. (Jour. Amer. Pharmac. Ass. Sci. Ed., vol. 40, p. 344 (1951)), etc., none of the peptide-type ergot alkaloids has thus far been produced in large quantity by culture.

The present inventors who have been engaged for many years in the study of the artificial culture of ergot fungus have discovered that in general elymoclavine, a new ergot alkaloid, exists in ergot and the culture of ergot fungus and that some kinds of ergot fungus produce in culture a relatively large amount of elymoclavine and agroclavine, and at the same time an extraordinarily large quantity of ergokryptinine. Furthermore, they have found that the culture of the above ergot fungus contains a few kinds of alkaloid and no impurities which are hard to separate, therefore the concentration of elymoclavine and ergokryptinine is extremely easy.

According to the process of the present invention the yield of ergokryptinine is abnormally excellent, for example, the yield from 100 g. of the dried substance obtained by drying the cultural material produced by liquid culture method amounts to ca. 1–2 g. To the ergot fungus of the kind described belong the fungi parasitic on *Elymus mollis* Trin.

Under certain conditions these fungi decrease their nature to be parasitic on the original host and in parallel with this the nature to produce ergot alkaloids, especially, ergokryptinine. On the other hand, there are some among the variants, which still retain the nature to produce ergokryptinine in large quantity whereas they have no longer the nature to be parasitic on the original host.

Incidentally, morphological discrimination of these fungi from others is difficult. The morphological properties of the fungi are as follows. The sclerotia are cylindrical to fusiform, having little or no furrows, measuring 3–30 mm. in length and 1–7 mm. in breadth. The perithecia are ovoidal to pyriform, measuring 130–250$\mu$ in height and 70–160$\mu$ in breath. The asci are linear and more or less cylindrical, measuring 70–165$\mu$ in length and 2–4.5$\mu$ in breadth. The ascospores are filiform, measuring 40–140$\mu$ in length and 0.3–1.2$\mu$ in breadth. The younger mycelia are thicker, measuring 2–7$\mu$ in diameter. The conidiospores are ovoidal to ellipsoidal, measuring 3–18$\mu$ in length and 2–8$\mu$ in breadth. As to the conidial productivity, some strains produce conidiospores abundantly and others but little.

The culture of the ergot fungus employed in the process of the present invention contains, in addition to ergokryptinine, agroclavine, elymoclavine, ergokryptine, ergosinine, ergosine and a trace, if any, of other alkaloids. In the case of solid culture, the ratio of the yields of ergokryptinine, agroclavine and elymoclavine is usually about 100:35:10 and the ratio is almost the same as a whole in the liquid culture, too. However, in the latter case, if the yields of alkaloids in cell material and in the liquid portion are observed separately, the ratio of the yields of the alkaloids in each portion varies with the cultural conditions, especially with the amount and kind of the nitrogen source and with the culture time. Ergokryptine, ergosinine, ergosine, etc. are generally produced in very small quantity in both cultures.

As culture method both solid and liquid cultures are available, but the latter is superior in the yield of ergokryptinine to the former which is generally carried out using bagasse or other porous substances impregnated with nutritive liquid. The liquid culture is also excellent in that it can be conducted in large scale.

In the case of the liquid culture it is advisable to obtain the ergokryptinine containing culture liquid successively by the so-called replacement culture method (Pilzdecke).

The nutrient source of the medium is selected according to the cultural conditions and the physiological state of the fungus. For example, the kind of nutrient is restricted to a certain extent in some cases and fairly wide range of the kind is available in others.

In the case of the replacement culture, difficultly assimilable substances, for example, mannitol are suitable as carbon source and readily assimilable substances such as aspartic acid, glutamic acid, asparagine, glutamine or ammonium salts of aspartic acid, glutamic acid, succinic acid, fumaric acid, maleic acid, malic acid, and tartaric acid are suitable as nitrogen source, in the first culture medium. However, in the second or the following culture media the constitution of the nutrient does not necessarily have to be the same as in the first medium and the kind of the nutrient can be varied widely.

In the process of the present invention a culture medium having a pH 3.2–8.4 is available for the propagation of ergot fungus, pH 6.6–6.8 being the most suitable. At a pH higher or lower than 3.2–8.4 the propagation is difficult. The culture temperature available for the propagation of the fungus is 10–34° C., the most suitable temperature being around 28° C. The conditions suitable for the propagation of the fungus, however, do not coincide with those suitable for the formation of ergot alkaloids. Some suppression of the propagation of the fungus favors the yield of the alkaloids. For the suppression the following treatments are preferable. (A) One or more of the carbon and nitrogen sources and inorganic salts in the medium are abnormally increased in quantity, or other substances suppressing the propagation of the fungus are added to the medium before inoculation of the fungus or during the incubation. (B) Culture temperature is maintained at a little lower than that most favorable for the propagation of the fungus. (C) A medium is employed which has a little higher or lower pH than that most suitable for the propagation of the fungus. (D) The amount of inoculum of the fungus, the depth of the medium, variation of the constitution of the nutrient, control of the air, or irradiation with visible and invisible light, etc. have the same effect. The above methods may be employed separately or in combination.

As to the substances suppressing the propagation of the fungus the large number thereof renders their complete enumeration impractical. Representative thereof are salts of heavy metals such as manganese, copper and zinc, salts of hydrofluoric acid, hydrochloric acid, hydrogen cyanide and arsenic acid, aromatic and fatty acids with or without substituent, such as formic acid, monohaloacetic acid, benzoic acid, aminobenzoic acid, phenylacetic acid, naphthylacetic acid, substances having alcoholic or phenolic hydroxyl-group, aromatic basic compounds such as aniline, diphenyl amine, indole, quinoline and their derivatives, aromatic hydrocarbon and antibiotics synthetic or obtainable from microbes and others. These substances are generally effective in small quantity, for example, below 0.01% of any one of them in the medium is sufficient for this purpose. Substances, such as sodium chloride, which slightly suppress the propagation of the fungus are of course employed in fairly large quantity.

Unlike ergot which has so far been used for the preparation of peptide-type ergot alkaloids, the culture obtained by the process of the present invention contains an extraordinary large quantity of ergokryptinine as above mentioned. The culture, however, contains no ergocristinine and ergocorninine, the presence of which would make the separation of ergokryptinine difficult, so that the separation of each alkaloid is extremely easy.

The resulting total alkaloids are separated from impurities according to the conventional method and individual alkaloids are isolated from the total alkaloids.

The solubility in water of ergokryptinine, agroclavine and elymoclavine increases in this order, and their partition coefficients between aqueous and organic solvents are of course clearly different. Therefore, they are separated from each other or from impurities by the application of their solubility in water or in organic solvent, or by the utilization of their behaviors at the separation from their solutions. The difference of their partition coefficients between two solvents immiscible with each other is also utilized for this purpose. In addition, dialysis, electric dialysis, electrophoresis, adsorption by cation exchange resin, etc. are employed for the same purpose, but with not much benefit.

In order to separate the alkaloids from the solid material such as the culture obtained by solid culture or the cell material obtained by liquid culture, they are extracted, as such or after drying at low temperatures and powdering, with an organic solvent such as ether, benzene, methanol, ethanol, acetone, chloroform, and ethyl acetate under acidic, neutral or alkaline condition after, if necessary, removing fat beforehand with petroleum or benzine. The extract obtained, by an organic solvent immiscible with water is shaken with acid water of below pH 4. In the case of the extract obtained by an organic solvent miscible with water, it is first dried and then treated as above. On alkalizing the acid solution with ammonia, sodium bicarbonate or with the like, ergokryptinine and the bulk of agroclavine separate out, nearly all elymoclavine remaining in the solution, from which the elymoclavine fraction is separated by extracting with an organic solvent such as ether or chloroform and then concentrating the extract.

When the above precipitate is dissolved in a suitable organic solvent such as chloroform or ethyl acetate and then shaken with acid water, only agroclavine goes into the latter, so an ergokryptinine fraction is obtained from the organic solvent solution, and an agroclavine fraction separates out on alkalizing the acid water. Agroclavine fraction is also obtained when the above acid solution is made alkaline and shaken with an organic solvent to dissolve the alkaloid therein and the organic solvent solution is subjected to counter current extraction or partition chromatography. In this case a small quantity of elymoclavine fraction is recovered.

When the acid aqueous solution of the total alkaloids mentioned above is shaken with an organic solvent such as chloroform or ethyl acetate, ergokryptinine goes into the organic solvents, while agroclavine and elymoclavine remain in the acid solution. Therefore, an ergokryptinine fraction is obtained from the organic solvent solution on concentration, and an agroclavine fraction separates out from the acid solution on alkalization, and an elymoclavine fraction is recovered from the mother liquid of the agroclavine.

The culture obtained by solid culture and the cell material obtained by liquid culture are also extracted, as such or after removal of fat, directly with acid water and the extract, as such or after concentration, is made alkaline. The alkaline solution is then either extracted with an organic solvent immiscible with water or treated with an adsorbent such as Japanese acid clay under acidic conditions and then eluted with an organic solvent. From these organic solvent solutions, each fraction of ergokryptinine, agroclavine and elymoclavine is separated according to the methods mentioned above.

In another case, the culture obtained by solid culture and the cell material obtained by liquid culture are extracted with acid water and the acid extract is shaken as such with an organic solvent such as chloroform, ethyl acetate and others, when most of the ergokryptinine goes into the organic solvent, while most of the agroclavine and elymoclavine remain in the acid water.

When the solid substance of culture mentioned above is extracted carefully with water or with an aqueous solvent for many hours, part of the alkaloids is extracted, which, however, consists for the most part of agroclavine and elymoclavine, from which each fraction of the alkaloids is separated, for instance, depending on their solubility in water.

The liquid portion of the culture obtained by liquid culture is worked up as follows.

The liquid, as such or after concentration, is adjusted to below pH 4 and after filtering it is shaken with an organic solvent such as chloroform or ethyl acetate, whereupon ergokryptinine goes into the organic solvent, while agroclavine and elymoclavine remain in the acid liquid. When the liquid is extracted with an organic solvent under nearly neutral conditions, ergokryptinine and agroclavine go into the organic solvent, only elymoclavine remaining in the liquid.

In another case the liquid is made alkaline after concentration, if necessary, and then extracted with an organic solvent immiscible with water. Otherwise, the liquid is treated with an adsorbent such as Japanese acid clay under acid conditions and then eluted with an organic solvent. From these solutions each fraction of ergokryptinine, agroclavine and elymoclavine is separated by the methods used in the case of the solid material.

Of the separation methods applying the difference of the partition coefficient of a substance between two solvents, counter current extraction and partition chromatography are especially important in the process of the present invention. For the large scale run, partitions chromatography is employed in the form of column partition chromatography.

The counter current extraction is generally carried out using acid water and an organic solvent immiscible with water. A solution of inorganic or organic acid or other acidic substance in water is used as the acid water. A buffer solution also may be used for this purpose. Anyone of ether, chloroform, butanol, ethyl acetate, etc. is used as the organic solvent immiscible with water. To take the extract of total alkaloids as an example, the extract is distributed, for instance, into water and butanol by counter current extraction and each fraction of the alkaloids is separated depending on its color reaction.

In the case of column partition chromatography, filter paper or other fibres, alumina, calcium carbonate, silicagel, starch, etc. are used as supporter, and water or aqueous solution of inorganic or organic acid as aqueous solvent, and an organic solvent, such as ether, chloroform, butanol, amylalcohol, ethyl acetate, saturated with water or with the above acid solution as developing organic solvent. The supporters, aqueous or developing organic solvents are combined appropriately, and they are of course not limited to the above substances. The developing solvent may be run down freely or with the aid of suction.

When the extract of total alkaloids is developed by column partition chromatography, three zones of ergokryptinine, agroclavine and elymoclavine are formed in the column. The zones are taken out separately and extracted with an organic solvent or with acid water, or the alkaloids in the zones are washed out separately.

The discrimination of the zones is based upon fluorescences rather than upon their color reactions.

The fractions of ergokryptinine, agroclavine and elymoclavine obtained by the methods mentioned above still contain impurities, therefore further purification is necessary to convert them into the pure state.

For example, the ergokryptinine fraction is dissolved in an organic solvent such as benzene, ethyl acetate or chloroform and the solution is shaken with alkaline water such as sodium or potassium hydroxide solution, when ergokryptinine and ergokryptine remain in the organic solvent, while impurities such as ergosinine, ergosine and others go into the alkaline water. When the organic solvent solution is evaporated to dryness and then treated with an organic solvent such as methanol, ergokryptinine is obtained in crystalline form.

Alternatively, the ergokryptinine fraction is dissolved in an organic solvent immiscible with water and the solution is shaken with acid water to dissolve the alkaloid therein. The acid solution is made alkaline and the resulting precipitate, after drying, is dissolved in an organic solvent such as methanol, ethanol, ethyl acetate and the solution is concentrated, whereupon ergokryptinine is obtained in crystalline form.

The agroclavine fraction is dissolved in an organic solvent such as ether or ethyl acetate under alkaline condition and the solution, after drying, is concentrated, when agroclavine seperates out on standing. Or the agroclavine fraction is dissolved in an organic solvent miscible with water such as methanol, ethanol or acetone and water is added to the solution to separate agroclavine in crystalline form. The agroclavine fraction is also purified by converting agroclavine into its salt and then liberating it from the solution of the salt with alkali.

The elymoclavine fraction is dissolved in a suitable amount of an organic solvent which readily dissolves elymoclavine, such as acetone, methanol, or ethanol, and insoluble impurities are filtered off. The elymoclavine thus purified to a certain extent may be crystallized and recrystallized from an organic solvent such as benzene, ether, chloroform, ethyl acetate, acetone, methanol or ethanol or even from water. Or the elymoclavine in its fraction is first converted into its salt and then liberated from the solution of the salt with alkali and finally purified by treating with or by recrystallizing from, an organic solvent.

As mentioned at the beginning of the specification, elymoclavine is a new ergot alkaloid and has the following properties.

It crystallizes from benzene, chloroform, ether, ethyl acetate, acetone, methanol, ethanol or water in colorless prisms. The crystal obtained from methanol is monoclinic prism having monoclinic axial angle, $\beta=96°$, refractive indices for D line, $\alpha'=1.62$, $\beta'=1.75\uparrow$. It melts with decomposition at 248–52°.

$$[\alpha]_D^{20}=-59°, [\alpha]_{Hg}^{20}=-98°$$

(ethanol), $[\alpha]_D^{20}=-136°$, $[\alpha]_{Hg}^{20}=-166°$ (pyridine). It has an N—CH$_3$ group in its molecule and its analytical data indicate $C_{16}H_{18}ON_2$. Like agroclavine, elymoclavine shows its maximum absorption spectrum at near 282 m$\mu$ and minimum at near 246 m$\mu$. It precipitates with tungstic acid, the Meyer's reagent and other alkaloidal reagents and is readily soluble in various inorganic and organic acids and the solutions give not only the Keller reaction, but also reddish purple and blue color reactions with the solutions of vanillin and p-dimethyl-aminobenzaldehyde in sulfuric acid, respectively. It is readily soluble in pyridine, soluble in acetone, methanol, ethanol and butanol, sparingly soluble in benzene, toluene, chloroform and ether, and insoluble in petroleum ether and ligroin. It is fairly soluble in cold water and the solution gives an alkaline reaction. It is sensitive to sunlight and its solutions in various solvents turn brown and assume a fluorescence. Like agroclavine, elymoclavine gives no isomers on treatment with acid or with alkali. It is hydrogenated into dihydro-compound, M. P. (decomp.) 239–40° C., $[\alpha]_D^{24}=-143°$, $[\alpha]_{Hg}^{24}=-182°$ (pyridine). When elymoclavine is developed by descending method on Toyo filter paper No. 131 at 24° C. over a period of 13–15 hours with the developing solvent prepared by shaking a mixture of 4 parts of n-butanol, 5 parts of water and 1 part of acetic acid and drawing off the lower layer, a spot is formed at R$f$ value 0.67. Sometimes a fluorescent spot is formed at R$f$ value 0.59 owing to the decomposition product of elymoclavine. Incidentally, the R$f$ values of lysergic acid, ergometrine, agroclavine and ergokryptine under the same conditions are 0.50, 0.66, 0.82 and 0.92, respectively. Elymoclavine has of course the physiological activities of ergot alkaloid and brings about an exciting effect on the separated uterus of the rabbit even in a dilution of 1:10,000,000.

*Example 1*

1.2 liters of a culture medium consisting of mannitol (5%), ammonium glutamate (1%), magnesium sulfate (0.03%) and tap water, adjusted to pH 5.2 with hydrochloric acid, is placed in a 3 liter flat-bottomed flask.

The culture medium is inoculated with a strain of ergot fungus parasitic on *Elymus mollis* Trin. and then subjected to surface culture at 26° C. After 40 days the culture liquid is poured out and acidified with sulfuric acid, and the remaining cell material is extracted repeatedly with diluted sulfuric acid.

The combined acid liquids are shaken with Japanese acid clay to adsorb alkaloids therein and the adsorbent is moistened with ammonia and extracted repeatedly with ether. The combined extracts are concentrated and then shaken with several portions of one tenth its volume of 1–3% solution of succinic acid in water. The acid solution is made alkaline to about pH 8 with ammonia and the resulting precipitate is separated from the mother liquid (A) by filtration. The precipitate is dissolved in a fairly large amount of chloroform and the solution is shaken with 3 portions of one third its volume of n/10 sulfuric acid to remove substances soluble in the acid solution. The acid solution (B) is put aside and the chloroform solution, after drying with calcium chloride, is evaporated to dryness and the residue is dissolved in benzene under ammonia alkaline condition. The benzene solution, after shaking with 1% sodium hydroxide solution to remove substances soluble in the alkali solution (the alkaline solution (C) is set aside), is evaporated to dryness and methanol is added dropwise to the residue, whereupon crystals separate out. The crystals are dissolved in hot methanol and the solution, after filtering off insolubles, is concentrated, when ergokryptinine separates out in crystalline form on standing. The yield is about 260 mg. The mother liquid (A) is shaken repeatedly with ether and the ethereal solution is concentrated and shaken several times with a small amount of n/10 sulfuric acid. The combined acid solutions are made alkaline with sodium bicarbonate and the resulting precipitate (D) is filtered off. The mother liquid is shaken repeatedly with benzene and the benzene solution is concentrated to 20 cc. The concentrated solution is allowed to stand for a while in a cool place and the resulting precipitate is filtered off and the mother liquid is left standing at room temperature, when elymoclavine separates out in crystalline form. The elymoclavine thus obtained is dissolved in a little hot acetone and the solution, after filtering off insolubles, is concentrated and the separated crystals are further purified by washing with a little cold acetone and recrystallizing from ethyl acetate. The yield is about 6 mg.

The acid solution (B) is made alkaline with ammonia and the resulting precipitate is separated from the mother liquid (E). The precipitate is dissolved in acetone and the solution, after filtering, is concentrated and then added with distilled water until a turbidity forms and allowed to stand at room temperature, when agroclavine separates out in crystalline form. The crystals are further dissolved in hot ethyl acetate and the solution, after filtering off insolubles, is concentrated, whereupon pure agroclavine is obtained in crystalline form. The yield is about 90 mg.

From the precipitate (D) agroclavine, from the mother liquid (E) elymoclavine, from the alkaline solution (C) ergokryptine, ergokryptinine and ergosinine are recovered in small quantity, respectively.

*Example 2*

1.3 liters of a culture medium consisting of mannitol (5%), ammonium glutamate (0.8%), potassium biphosphate (0.1%), magnesium sulfate (0.03%) and tap water, adjusted to pH 5.2 with hydrochloric acid, is placed in a 3 liter flat-bottomed flask. The culture medium is inoculated with ergot fungus, cultivated and worked up essentially the same as in Example 1. The ethereal solution of total alkaloids obtained by extracting the adsorbent is concentrated to 1 liter and shaken repeatedly with 50 cc. portions of a 1–3% solution of citric acid in water. The acid solution is made alkaline and shaken again with ether and the ethereal solution is evaporated to remove the ether completely. The residue is dissolved in hot ammonia alkaline acetone and the solution is concentrated to one third its volume and filtered after standing for a while in a cool place. The filtrate is diluted with a large quantity of water and the resulting precipitate (A) is filtered off and the filtrate is shaken repeatedly with pure ether. The combined ethereal solutions are evaporated to dryness under reduced pressure and the resinous residue is dissolved in boiling benzene and the solution is filtered and concentrated. The concentrated solution is cooled rapidly and the resulting precipitate is filtered off and the filtrate is allowed to stand at room temperature, whereupon elymoclavine separates out. A small quantity of agroclavine is recovered from the mother liquid.

The precipitate (A) is dissolved in hot ammonia alkaline alcohol and the solution is filtered and admixed with a large volume of distilled water and the resulting precipitate (B) is filtered off. The filtrate is shaken repeatedly with pure ether and the combined ethereal solution is evaporated to dryness under reduced pressure and the resinous residue is dissolved in boiling benzene and the benzine solution, after filtering, is concentrated and left standing, when elymoclavine separates out. A little agroclavine is recovered from the mother liquid. The combined elymoclavine is washed with a small quantity of cold acetone and recrystallized from alcohol to give a pure product. The yield is 6 mg.

The precipitate (B) is dissolved in ethyl acetate and the solution, after shaking repeatedly with dilute acetic acid, is evaporated to dryness under reduced pressure (the dilute acetic acid solution (C) is set aside). The residue is dissolved in benzene under ammonia alkaline condition and the solution, after shaking repeatedly with a little potassium hydroxide solution, is evaporated to dryness (the alkaline solution (D) is set aside). The residue consisting of ergokryptinine is treated with methanol and then purified by recrystallization as in Example 1. The yield is 180 mg. The acid solution (C) is made alkaline with ammonia and the resulting precipitate is dissolved in half its weight of concentrated succinic acid solution. From the solution agroclavine separates out as succinate, from the solution of which agroclavine precipitates on alkalization with ammonia. The precipitate is dissolved in a little methanol and the solution is added with distilled water to give crystals of agroclavine. The yield is about 45 mg.

A small quantity of ergokryptine and ergokryptinine is recovered from the alkaline solution (D).

*Example 3*

1.2 liters of a culture medium consisting of mannitol (5%), asparagine (1.5%), potassium biphosphate (0.1%), magnesium sulfate (0.05%) and tap water, adjusted to pH 5.4 with sulfuric acid, is placed in a 3 liter flat-bottomed flask. The culture medium, after inoculating with a strain of ergot fungus parasitic on *Elymus mollis* Trin., is subjected to surface culture at 26–28° C. After 36 days the culture liquid is separated from the cell material and the cell material is washed with n/10 sulfuric acid until the washing gives no more alkaloid reaction. The culture liquid is combined with the washing, made alkaline with ammonia and extracted twice with ether using an ejector. The ethereal extract is concentrated and shaken repeatedly with about one tenth its volume of dilute acetic acid. The acid solution is shaken with two portions of ca. half its volume of chloroform, when ergokryptinine goes into the chloroform, agroclavine and elymoclavine remaining in the acid solution (A). The chloroform solution, after drying with calcium chloride, is evaporated to dryness and the residue is treated with ether under ammonia alkaline condition. The ethereal solution is shaken repeatedly with a small amount of n/10 acetic acid and the acid solution is adjusted to pH 8.0 with ammonia and the resulting precipitate is filtered off. After drying, the precipitate is dissolved in a fairly large amount of hot methanol and the solution is filtered, concentrated and allowed to stand at room temperature, when crude ergokryptinine separates out, which is purified by recrystallization from ethyl acetate. The yield is about 240 mg. A small quantity of ergokryptine, ergokryptinine and ergosinine is recovered from the mother liquid.

The acid solution (A) is made alkaline with ammonia and, after filtering off the resulting precipitate (B), shaken repeatedly with benzene and the benzene solution is concentrated and filtered while hot. When the filtrate is left standing at room temperature, the crystals of elymoclavine separate out adhering on the bottom of the vessel, while impurities deposit as light precipitate, therefore the former is separated from the latter by decanting the liquid. The crude elymoclavine thus obtained is washed with cold benzene and dissolved in hot chloroform and the solution is filtered, concentrated and allowed to stand to give pure elymoclavine. The yield is about 8.0 mg. The precipitate (B) is dissolved in ether under ammonia alkaline condition and the solution, after drying with sodium sulfate, is concentrated to give agroclavine, which is further purified by recrystallization from ether. The yield is about 80 mg.

*Example 4*

1.2 liters of a culture medium consisting of mannitol (5%), aspartic acid (0.8%), potassium biphosphate (0.1%), magnesium sulfate (0.05%) and tap water, adjusted to pH 5.0 with 30% ammonia, is placed in a 3 liter flat-bottomed flask. The culture medium, after inoculating with a variant obtained from the ergot fungus parasitic on *Elymus mollis* Trin. by irradiating with radium, is subjected to surface culture at 26–28° C.

After 32 days the culture liquid is poured out and the under side of the cell material is washed with a solution (pH ca. 5.0) of succinic acid in water until the washing gives no more alkaloid reaction. The cell material is subjected with a suitable new culture medium to so-called "replacement culture."

The culture liquid is combined with the washing, made alkaline with ammonia and extracted twice with benzene using an ejector. The extract is concentrated and shaken repeatedly with a small amount of 3% lactic acid solution. The acid solution is made alkaline with sodium bicarbonate and the resulting precipitate is filtered off (the mother liquid (A) is put aside). The precipitate is dissolved in a suitable amount of n-butanol at room temperature and the solution is poured in a glass column of ca. 45 cm. high and ca. 10 cm. wide, packed with 1.6 kg. of pure potato starch kneaded with 2 liters of distilled water. When the butanol solution has permeated into the starch layer, a developing solvent, prepared by shaking thoroughly a mixture of 4 parts of n-butanol, 1 part of acetic acid and 5 parts of distilled water and drawing off the lower layer, is run down freely from the top of the starch layer. After 18 hours the solvent on the starch layer is discarded and the column is left standing for a while, when the solvent reaches ca. 20 cm. from the top of the starch layer. Upon observing the column under ultra-violet rays, several fluorescent zones are found. The lowest purplish blue fluorescent zone between 10 and 15 cm. from the top of the starch layer is cut out and extracted repeatedly with the smallest possible quantity of 10% acetic acid. The extract is shaken with ether to remove butanol in the extract and made alkaline with ammonia, and the resulting precipitate is filtered off. The precipitate is dried, dissolved in a large amount of hot ethyl acetate and, after filtering off insolubles, concentrated, when crude ergokryptinine separates out, which is further purified by recrystallization from methanol. The yield is 230 mg. per liter of the culture liquid. The part between ca. 7 and 9 cm. from the top of the starch layer, which comprises yellowish green and purplish blue fluorescent zones is cut out and extracted repeatedly with the smallest possible quantity of n/10 sulfuric acid and the extract is worked up as above. The resulting precipitate is dissolved in ether under ammonia alkaline condition and the ethereal solution, after drying, is concentrated and shaken repeatedly with 1–3% succinic acid solution. The ether in the acid solution is driven off and the acid solution is made alkaline with ammonia and the resulting precipitate is filtered off. As in the case of Example 1, the precipitate is dissolved in acetone and the solution is added with water to precipitate agroclavine, which is further purified by recrystallization from ethyl acetate. The yield is 80 mg. per liter of the culture liquid. The mother liquid (A) is treated as in the mother liquid (A) of Example 1 to give elymoclavine. The yield is ca. 5 mg. per liter of the culture liquid. In this case a small quantity of agroclavine is also recovered as in Example 1. From the part between ca. 5–7 cm. from the top of the starch layer, a small amount of elymoclavine is recovered if treated as in Example 5.

*Example 5*

The surface growth culture of ergot fungus is carried out at 26–28° C. using the same medium and the same strain as in the case of Example 1. After 35 days the culture liquid is separated from the cell material, and the extraction with dilute sulfuric acid, adsorption by Japanese acid clay and elution with ether are carried out as in Example 1. The ethereal solution is concentrated and shaken repeatedly with one tenth its volume of n/10 sulfuric acid, and the resulting precipitate is separated. The acid solution is adjusted to pH 4.2 with ammonia and the resulting precipitate is separated from the mother liquid. The precipitate combined with the above precipitate is dissolved in a little acetone and the solution is admixed with a large amount of water, and the resulting precipitate (A) is separated from the mother liquid. The mother liquid is combined with the above mother liquid, made alkaline with ammonia and then shaken repeatedly with ether. The ethereal solution is evaporated to remove the ether completely and the residue is dissolved in n-butanol. The butanol solution is poured into a glass column of ca. 45 cm. high and 10 cm. wide, packed with 1.6 kg. of pure potato starch kneaded with 2 liters of 5% acetic acid. When the butanol solution has permeated into the starch layer, the same solvent as in Example 4 is run down for 16 hours. At the end of the time the solvent on the starch layer is discarded and the column is left standing until the solvent no longer drops down from the lower end of the column. As in Example 4, five fluorescent zones are found and the bulk of elymoclavine is contained between the second and third zones, which are cut out and shaken repeatedly with a small quantity of n/10 sulfuric acid containing some n-butanol. The butanol in the acid solution is driven off and the acid solution is made alkaline with ammonia and shaken repeatedly with ether. The ethereal solution is evaporated to dryness and the residue is dissolved in a large amount of boiling benzene. After filtering off insolubles, the benzene solution is evaporated to dryness and the crystalline residue is added with acetone. The acetone solution, after filtering off insolubles, is evaporated nearly to dryness, when some crystals separate out from the resinous residue. The crystals are separated by washing with acetone and dissolved in hot ethyl acetate and the solution is concentrated, whereupon elymoclavine separates out on standing. The yield is ca. 10 mg. The lowest fluorescent zone is worked up as in Example 4 and ca. 130 mg. of ergokryptinine and a little ergokryptine are obtained in the crystalline form. From the part between the top of the lowest zone and the next yellowish green and purplish blue fluorescent zones is recovered ca. 80 mg. of agroclavine by treating as in Example 4. From the precipitate (A), ca. 100 mg. of ergokryptinine and a little ergokryptine are obtained in crystalline form.

*Example 6*

The aseptically washed cell material obtained in Example 3 is floated on 1.2 liters of a sterilized solution consisting of glucose (6%), ammonium succinate (0.8%), potassium biphosphate (0.1%), magnesium sulfate (0.03%) and tap water, adjusted to pH 5.4 with succinic acid, and the whole is subjected to a stationary culture at 24–26° C. After 22 days the culture liquid is separated from the cell material and the cell material is extracted repeatedly with n/10 acetic acid. The acid extract is combined with the culture liquid, made alkaline with ammonia and extracted twice with ether using an ejector. The ethereal solution is evaporated to remove the ether completely and the residue is dissolved in n-butanol. The butanol solution is poured into a glass column of ca. 40 cm. high and ca. 5 cm. wide, packed with 360 g. of pure potato starch kneaded with 420 cc. of 5% acetic acid. When the butanol solution has permeated into the starch layer, the solvent used in Example 3 is run down from the top of the starch layer for 16 hours. Five fluorescent zones form in the starch layer. The lowest purplish blue fluorescent zone between ca. 10 cm. and 14 cm. from the top of the starch layer is cut out and extracted repeatedly with a small amount of 10% acetic acid. The acid extract is shaken with ether to remove the butanol and made alkaline with ammonia and the resulting precipitate is filtered off. The precipitate is dissolved in benzene under ammonia alkaline condition and the solution, after shaking twice with 1/10 its volume of 1% sodium hydroxide solution, is evaporated to dryness. The residue is dissolved in the smallest possible amount of ethanol and the solution is filtered and concentrated to a very small volume, when ergokryptinine separates out on standing at a cool place. The ergokryptinine thus obtained is further dissolved in methanol and the solution, after concentration, is allowed to stand at room temperature to give pure ergokryptinine. The yield is 210 mg. The zone between 4 and 7 cm. from the top of the starch layer is cut out and extracted repeatedly with a small amount of n/10 sulfuric acid. The acid extract is shaken with ether to remove the butanol in the extract, made alkaline with ammonia and shaken repeatedly with ether. The ethereal solution is evaporated to dryness and the residue is dissolved in boiling benzene and the benzene solution is filtered and left standing in a cool place. The resulting precipitate is filtered off and the filtrate is concentrated and allowed to stand at room temperature, whereupon elymoclavine separates out. The yield is ca. 10 mg.

The zone between ca. 7–9 cm. from the top of the starch layer is subjected to extraction with dilute sulfuric acid, taking up in ether and shaking with acid water successively as in Example 4. The acid solution is made alkaline with ammonia, and the resulting precipitate of agroclavine is further purified by converting it into acid succinate, and then pure crystals of agroclavine are obtained as in Example 2. The yield is ca. 70 mg.

We claim:

1. A method of preparing the ergot alkaloids: ergokryptinine, agroclavine and elymoclavine, which comprises surface growing ergot fungus which is parasitic to *Elymus mollis* Trin. in an aqueous medium having a pH between 3.2 and 8.4 and containing a soluble carbohydrate, a source of assimilable nitrogen and essential mineral salts at a temperature within the range 10° C. to 34° C., whereby the aqueous medium is fermented and the aforesaid alkaloids are produced.

2. A method of preparing the ergot alkaloids: ergokryptinine, agroclavine and elymoclavine, which comprises floating a mycelial pad, obtained by surface growing ergot fungus which is parasitic to *Elymus mollis* Trin. in an aqueous medium, on an aqueous nutrient medium containing a soluble carbohydrate, a source of assimilable nitrogen and essential mineral salts, and effecting further surface growth of the mycelial pad material in said nutrient medium at a pH between 3.2 and 8.4 and at a temperature within the range 10° C. to 34° C., whereby the nutrient medium is fermented and the aforesaid alkaloids are produced.

3. A method of preparing the ergot alkaloids: ergokryptinine, agroclavine and elymoclavine, which comprises surface growing ergot fungus which is parasitic to *Elymus mollis* Trin. in an aqueous medium having a pH between 3.2 and 8.4 and containing mannitol, a source of assimilable nitrogen and essential mineral salts at a temperature within the range 10° C. to 34° C., whereby the aqueous medium is fermented and the aforesaid alkaloids are produced.

4. A method of preparing the ergot alkaloids: ergokryptinine, agroclavine and elymoclavine, which comprises surface growing ergot fungus which is parasitic to *Elymus mollis* Trin. in an aqueous medium having a pH between 3.2 and 8.4 and containing a soluble carbohydrate, a source of assimilable nitrogen which comprises ammonium ion, and essential mineral salts at a temperature within the range 10° C. to 34° C., whereby the aqueous medium is fermented and the aforesaid alkaloids are produced.

5. A method of preparing the ergot alkaloids: ergokryptinine, agroclavine and elymoclavine, which comprises surface growing ergot fungus which is parasitic to *Elymus mollis* Trin. in an aqueous medium having a pH between 3.2 and 8.4 and containing a soluble carbohydrate, an amino acid and essential mineral salts at a temperature within the range 10° C. to 34° C., whereby the aqueous medium is fermented and the aforesaid alkaloids are produced.

6. A method of preparing the ergot alkaloids: ergokryptinine, agroclavine and elymoclavine, which comprises surface growing ergot fungus which is parasitic to *Elymus mollis* Trin., in an aqueous medium having an initial pH between about 5 and 6 and containing a soluble carbohydrate, a source of assimilable nitrogen and essential mineral salts at a temperature within the range 10° C. to 34° C., whereby the aqueous medium is fermented and the aforesaid alkaloids are produced.

7. A method of preparing the ergot alkaloids: ergokryptinine, agroclavine and elymoclavine, which comprises surface growing ergot fungus which is parasitic to *Elymus mollis* Trin., in an aqueous medium having a pH between 3.2 and 8.4 and containing a soluble carbohydrate, a source of assimilable nitrogen and essential mineral salts at a temperature within the range 10° C. to 34° C., whereby the aqueous medium is fermented and the aforesaid alkaloids are produced, adsorbing the alkaloids from the resultant aqueous liquor onto an adsorbent under an acidic pH and eluting the alkaloids from the adsorbent with an alkalized organic solvent.

8. A method of recovering the ergot alkaloids: ergokryptinine, agroclavine and elymoclavine from an aqueous liquor containing the said alkaloids, which comprises adsorbing the alkaloids onto an adsorbent under an acidic pH, eluting the alkaloids with an organic solvent under an alkaline pH, and extracting the alkaloids in the eluate into an acidic aqueous solvent.

9. A method of recovering the ergot alkaloids: ergokryptinine, agroclavine and elymoclavine from an aqueous liquor containing the said alkaloids, which comprises adsorbing the alkaloids onto an adsorbent under an acidic pH, eluting the alkaloids with an organic solvent under an alkaline pH, extracting the alkaloids in the eluate into an acidic aqueous solvent, and alkalizing the extract to about pH 8 to precipitate an ergokryptinine and agroclavine fraction while the elymoclavine fraction remains in solution.

10. A method of recovering the ergot alkaloids: ergokryptinine, agroclavine and elymoclavine from an aqueous liquor containing the said alkaloids, which comprises adsorbing the alkaloids onto an adsorbent under an acidic pH, eluting the alkaloids with an organic solvent under an alkaline pH, extracting the alkaloids in the eluate into an acidic aqueous solvent, alkalizing the extract, extracting the alkalized extract with an organic solvent, distilling off the solvent from the so-obtained extract, dissolving the residue in a water-miscible organic solvent, and adding water to the resultant solution, whereby an ergokryptinine and agroclavine fraction is precipitated while the elymoclavine fraction remains in the aqueous solution.

11. A method of recovering the ergot alkaloids: ergokryptinine, agroclavine and elymoclavine from an acidic aqueous liquor containing the said alkaloids, which comprises extracting an ergokryptinine fraction therefrom with a water-immiscible organic solvent, whereby a raffinate is obtained which contains an agroclavine and elymoclavine fraction.

12. A method of recovering the ergot alkaloids: ergokryptinine, agroclavine and elymoclavine from an acidic aqueous liquor containing the said alkaloids, which comprises alkalizing the aqueous liquor, whereby an ergokryptinine and agroclavine fraction precipitates and the elymoclavine fraction remains in solution.

13. A method of preparing the ergot alkaloids: ergokryptinine, agroclavine and elymoclavine, which comprises surface growing ergot fungus which is parasitic to *Elymus mollis* Trin. in an aqueous medium having a pH between 3.2 and 8.4 and containing a soluble carbohydrate, a source of assimilable nitrogen and essential mineral salts at a temperature within the range 10° C. to 34° C., whereby the aqueous medium is fermented and the aforesaid alkaloids are produced, the ergot fungus being the irradiated fungus parasitic to *Elymus mollis* Trin.

14. A product obtained by surface growing ergot fungus which is parasitic to *Elymus mollis* Trin., in an aqueous medium having a pH between 3.2 and 8.4 and containing a soluble carbohydrate, a source of assimilable nitrogen and essential mineral salts at a temperature within the range 10° C. to 34° C., said product consisting essentially of a mixture of alkaloid and fermented aqueous medium, which alkaloid corresponds to the formula $C_{16}H_{18}ON_2$ and shows $[\alpha]_D^{20} = -59°$ and $$[\alpha]_{Hg}^{20} = -98°$$

(in ethanol) and $[\alpha]_D^{20} = -136°$ and $[\alpha]_{Hg}^{20} = -166°$ (in pyridine), and the maximum ultraviolet absorption spectrum at near 282 m$\mu$, melts with decomposition at 248–252° C., is soluble in cold water and has uterus-contracting activity.

References Cited in the file of this patent

UNITED STATES PATENTS

| | | |
|---|---|---|
| 1,967,564 | Thompson | July 24, 1934 |
| 2,056,360 | McCrea | Oct. 6, 1936 |
| 2,080,954 | Stall | May 18, 1937 |
| 2,114,306 | Knessner | Apr. 19, 1938 |
| 2,400,143 | Waksman | May 14, 1946 |
| 2,640,007 | Foote et al. | May 26, 1953 |

OTHER REFERENCES

Abe: Japan Patent 178,336, March 31, 1949, cited C. A. 45, 6352 (1951).

Michener: Am. J. Botany 37, 52–9 (1950).

Dem-Zajec: C. A. 45, 7306 (1951).

Baldacci: C. A. 40, 6650 (1946).

Baldacci: C. A. 40, 6668 (1946).

Tanaka et al.: J. Pharm. Soc. Japan, vol. 72, pp. 616–620 (1952), as abstracted in Chem. Abstr., vol. 46, col. 9782 (1952).

Foster: The Botanical Review, vol. V, No. 4, April 1939, p. 207.

Wolf et al.: The Fungi, vol. I, Wiley, pp. 191–2, QK–603–W6.

Abe et al.: (II) J. Agr. Chem. Soc., Jap., vol 25, p. 458 (1952).

UNITED STATES PATENT OFFICE

CERTIFICATE OF CORRECTION

Patent No. 2,835,675                                     May 20, 1958

Matazo Abe et al.

It is hereby certified that error appears in the above numbered patent requiring correction and that the said Letters Patent should read as corrected below.

In the grant, lines 1, 2 and 3, for "Matazo Abe, of Nishinomiya, Hyogo, Togo Yamano, of Yamatotakada, Nara, Yoshiharu Kozu, of Nakagyoku, Kyoto, and Mitsugi Kusumoto, of Nishimazato, Higashinariku, Japan," read -- Matazo Abe, of Nishinomiya, Hyogo, Togo Yamano, of Yamatotakada, Nara, Yoshiharu Kozu, of Nakagyoku, Kyoto, and Mitsugi Kusumoto, of Nishiimazato, Higashinariku, Japan, assignors to Takeda Pharmaceutical Industries, Ltd., of Osaka, Japan, --; lines 12 and 13, for "Matazo Abe, Togo Yamano, Yoshiharu Kozu, and Mitsugi Kusumoto, their heirs" read -- Takeda Pharmaceutical Industries, Ltd., its successors --; in the heading to the printed specification, lines 4, 5, 6 and 7, for "Matazo Abe, Nishinomiya, Hyogo, Togo Yamano, Yamatotakada, Nara, Yoshiharu Kozu, Nakagyoku, Kyoto, and Mitsugi Kusumoto, Nishiimazato, Higashinariku, Japan" read -- Matazo Abe, Nishinomiya, Hyogo, Togo Yamano, Yamatotakada, Nara, Yoshiharu Kozu, Nakagyoku, Kyoto, and Mitsugi Kusumoto, Nishiimazato, Higashinariku, Japan, assignors to Takeda Pharmaceutical Industries, Ltd., Osaka, Japan --.

Signed and sealed this 12th day of August 1958.

(SEAL)
Attest:

KARL H. AXLINE
Attesting Officer

ROBERT C. WATSON
Commissioner of Patents